US010626802B2

(12) United States Patent
Goodman et al.

(10) Patent No.: US 10,626,802 B2
(45) Date of Patent: Apr. 21, 2020

(54) DUCTED GAS TURBINE ENGINE STABILITY BLEED VALVE WITH PASSIVE AND ACTIVE SHUTOFF

(71) Applicant: United Technologies Corporation, Farmington, CT (US)

(72) Inventors: Robert B. Goodman, West Hartford, CT (US); Michael D. Greenberg, Bloomfield, CT (US)

(73) Assignee: United Technologies Corporation, Farmington, CT (US)

(*) Notice: Subject to any disclaimer, the term of this patent is extended or adjusted under 35 U.S.C. 154(b) by 0 days.

(21) Appl. No.: 16/137,874

(22) Filed: Sep. 21, 2018

(65) Prior Publication Data

US 2020/0095944 A1 Mar. 26, 2020

(51) Int. Cl.
| | | |
|---|---|---|
| *F16K 1/12* | (2006.01) | |
| *F02C 9/18* | (2006.01) | |
| *F01D 17/10* | (2006.01) | |
| *F02C 3/13* | (2006.01) | |
| *F01D 17/14* | (2006.01) | |
| *F04D 27/02* | (2006.01) | |

(52) U.S. Cl.
CPC ............ *F02C 9/18* (2013.01); *F01D 17/105* (2013.01); *F01D 17/145* (2013.01); *F02C 3/13* (2013.01); *F16K 1/126* (2013.01); *F04D 27/0215* (2013.01); *F05D 2260/85* (2013.01); *Y10T 137/3476* (2015.04)

(58) Field of Classification Search
CPC .......... Y10T 137/3476; Y10T 137/353; Y10T 137/3367; F16K 1/126
See application file for complete search history.

(56) References Cited

U.S. PATENT DOCUMENTS 2,919,714 A 1/1960 Mrazek et al.
3,540,464 A * 11/1970 Renzi ...................... F02C 7/047
137/221

(Continued)

FOREIGN PATENT DOCUMENTS

EP 3255282 12/2017

OTHER PUBLICATIONS

EP search report for EP19197222.3 dated Feb. 13, 2020.

*Primary Examiner* — Robert K Arundale
(74) *Attorney, Agent, or Firm* — Getz Balich LLC

(57) ABSTRACT

A bleed air valve comprises a piston that moves along a guide, where the piston includes a first surface and an opposing second surface. A pressure divider network includes a divider network inlet having an inlet cross sectional area in fluid communication with a fluid passage, a divider network outlet having an outlet cross sectional area in fluid communication with ambient pressure, and a network chamber in fluid communication with the divider network inlet and the divider network outlet. The network chamber has a pressure value between pressure at the divider network inlet and pressure at the divider network outlet. A shuttle valve includes a shuttle inlet and a shuttle outlet, where the shuttle outlet is in fluid communication with the first surface. An electromechanical valve receives a command signal and in response provides compressed air to an electromechanical valve output that is in fluid communication with the shuttle inlet.

17 Claims, 4 Drawing Sheets

(56) References Cited

U.S. PATENT DOCUMENTS

| | | | | |
|---|---|---|---|---|
| 3,792,713 A | * | 2/1974 | Zadoo | F16K 1/126 |
| | | | | 137/486 |
| 3,792,716 A | * | 2/1974 | Sime | F16K 1/126 |
| | | | | 137/492 |
| 3,825,026 A | * | 7/1974 | Salerno | F01D 17/145 |
| | | | | 137/219 |
| 3,865,128 A | * | 2/1975 | Zadoo | G05D 16/106 |
| | | | | 137/220 |
| 4,610,265 A | * | 9/1986 | Nelson | F16K 1/126 |
| | | | | 137/219 |
| 6,981,842 B2 | * | 1/2006 | D'Angelo | F01D 17/105 |
| | | | | 415/144 |
| 7,104,282 B2 | | 9/2006 | Hooker et al. | |
| 8,814,498 B2 | | 8/2014 | Goodman et al. | |
| 9,689,315 B2 | | 6/2017 | Marocchini et al. | |
| 9,849,992 B2 | | 12/2017 | Goodman et al. | |
| 9,957,899 B1 | | 5/2018 | Greenberg et al. | |
| 2014/0124059 A1 | * | 5/2014 | McAuliffe | F16K 31/12 |
| | | | | 137/492 |
| 2016/0237913 A1 | * | 8/2016 | Marocchini | F01D 17/105 |

\* cited by examiner

DUCTED GAS TURBINE ENGINE STABILITY BLEED VALVE WITH PASSIVE AND ACTIVE SHUTOFF

BACKGROUND OF THE INVENTION

1. Technical Field

The present disclosure relates to air valves, more particularly, to an inline bleed air valve for a gas turbine engine.

2. Background Information

Gas turbine engines, such as those that power modern commercial and military aircraft, generally include a compressor section to pressurize and create airflow to feed a combustor section to burn a hydrocarbon fuel in the presence of the pressurized air, and a turbine section to extract energy from the resultant combustion gases.

Stability bleed valves are commonly used in traditional and geared turbofan engines primarily during engine start to prevent compressor surge. The valves are also used for low power stability and stall recovery. Stability bleed valves are typically poppet valves, which are spring loaded open and gradually close, via a pressure force acting on the poppet as the engine speeds up during start. Poppet valves vent the compressed air overboard.

There is a need for an improved stability bleed valve for both idle and sub idle conditions to improve engine stability margins.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a bleed air valve that comprises a housing that includes an inlet at a first end, an outlet at a second end, and a center portion between the inlet and the outlet to selectively provide a pneumatic flow path between the inlet and the outlet via a passage in the center portion. A piston moves along a center guide, where the piston includes a first piston surface and an opposing second piston surface, and the piston moves along the center guide in response to forces applied to the first piston surface and the second piston surface, where the piston is spring biased to an open position such that the inlet and the outlet are in fluid communication. A pressure divider network includes a divider network inlet having an inlet cross sectional area in fluid communication with the passage, a divider network outlet having an outlet cross sectional area in fluid communication with ambient pressure, and a network chamber in fluid communication with the divider network inlet and the divider network outlet, where the network chamber has an intermediate pressure value between pressure at the divider network inlet and pressure at the divider network outlet and based upon the inlet cross sectional area and the outlet cross sectional area. A shuttle valve includes a shuttle valve inlet and a shuttle valve outlet, where the shuttle valve outlet is in fluid communication with the piston first surface. A solenoid valve receives a command signal and in response provides compressed air to a solenoid valve output that is in fluid communication with the shuttle valve inlet. A spring applies a force to the second piston surface to spring bias the bleed air valve to the open position.

The outlet orifice divider cross sectional area may be greater than the inlet orifice divider cross sectional area.

The solenoid valve may receive gas turbine engine compressor discharge pressure P3 such that when the solenoid valve that receives the command signal to close the solenoid valve provides the compressor discharge pressure P3 to the solenoid valve output.

The inlet orifice divider cross sectional area may be less than 50% of the outlet cross sectional area.

The center guide may be axially aligned with the inlet and the outlet.

The shuttle valve may include a second shuttle valve inlet in fluid communication with the intermediate pressure value.

The shuttle valve may be integral with the housing.

Aspects of the disclosure are also directed to a bleed air valve comprising a housing that includes an inlet at a first end, an outlet at a second end, and a center portion between the inlet and the outlet to selectively provide a pneumatic flow path between the inlet and the outlet via a passage in the center portion. A piston moves along a center guide, where the piston includes a first piston surface and an opposing second piston surface, and the piston moves along the center guide in response to forces applied to the first piston surface and the second piston surface, where the piston is spring biased to an open position such that the inlet and the outlet are in fluid communication. A pressure divider network includes a divider network inlet having an inlet cross sectional area in fluid communication with the passage, a divider network outlet having an outlet cross sectional area in fluid communication with ambient, and a network chamber in fluid communication with the divider network inlet and the divider network outlet, where the network chamber has an intermediate pressure value between pressure at the divider network inlet and pressure at the divider network outlet. A valve includes a valve inlet and a valve outlet, where the valve outlet is in fluid communication with the piston first surface. A control valve receives a command signal and in response provides compressed air to a control valve output that is in fluid communication with the shuttle valve inlet.

A spring may apply a force to the second piston surface.

The network chamber may include an intermediate pressure value between pressure at the divider network inlet and pressure at the divider network outlet that is dependent on the inlet cross sectional area and the outlet cross sectional area.

The shuttle valve also includes a second shuttle value inlet in fluid communication with the intermediate pressure value.

The inlet orifice divider cross sectional area may be less than 50% of the outlet cross sectional area.

The control valve may comprise an electromechanical valve.

The valve may comprise a shuttle valve.

Aspects of the disclosure are further directed to an aircraft gas turbine engine bleed air valve that comprises a housing that includes an inlet at a first end, an outlet at a second end, and a center portion between the inlet and the outlet to selectively provide a pneumatic flow path between the inlet and the outlet via a passage in the center portion. A piston axially moves along a center guide, where the piston includes a first piston surface and an opposing second piston surface, and the piston axially moves along the center guide in response to forces applied to the first piston surface and the second piston surface, where the piston is spring biased to an open position such that the inlet and the outlet are in fluid communication. A pressure divider network that includes a divider network inlet having an inlet cross sectional area in fluid communication with the passage, a divider network outlet having an outlet cross sectional area in fluid communication with ambient pressure, and a network chamber in fluid communication with the divider network inlet and the divider network outlet, where the network chamber has an intermediate pressure value between pressure at the divider network inlet and pressure at the divider network outlet. A shuttle valve includes a shuttle valve inlet and a shuttle valve outlet, where the shuttle valve outlet is in fluid communication with the piston first surface. An electromechanical valve receives a command signal and in response provides compressed air to an electromechanical valve output that is in fluid communication with the shuttle valve inlet. A spring applies a force to the second piston surface to spring bias the bleed air valve to the open position to spring bias the aircraft gas turbine engine bleed air valve to the open position to bleed compressor air to ambient.

The network chamber may have the intermediate pressure value between pressure at the divider network inlet and pressure at the divider network outlet that is dependent on the inlet cross sectional area and the outlet cross sectional area.

The shuttle valve may include a second shuttle valve inlet in fluid communication with the intermediate pressure value.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
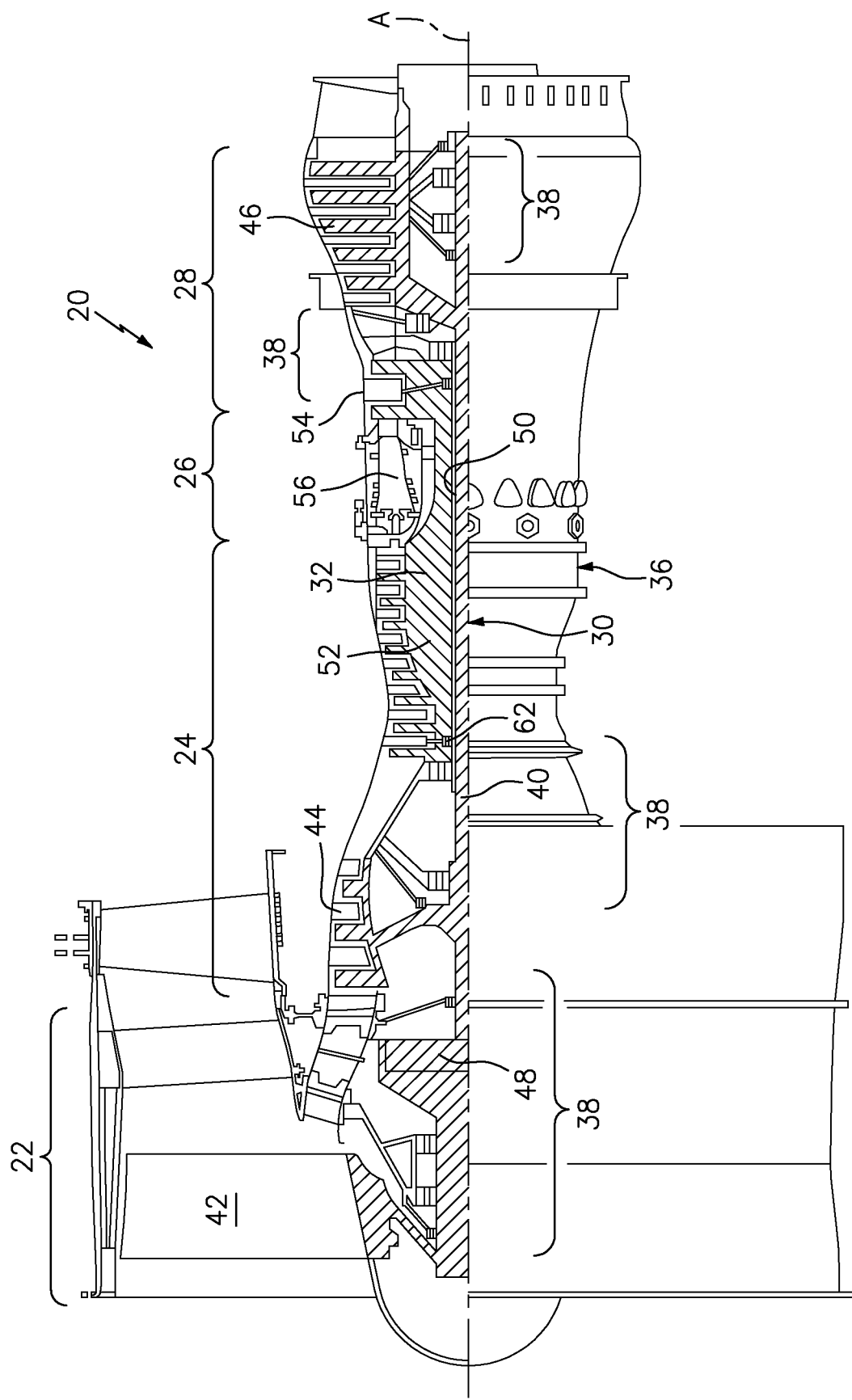
FIG. 1 is a schematic cross-section of an example gas turbine engine.

It is noted that various connections are set forth between elements in the following description and in the drawings (the contents of which are incorporated in this specification by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Aspects of the disclosure may be applied in connection with a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines (not shown) might include an augmentor section among other systems or features. Although depicted as a high-bypass turbofan in the disclosed non-limiting embodiment, it should be appreciated that the concepts described herein are not limited to use only with turbofan architectures as the teachings may be applied to other types of turbine engines such as turbojets, turboshafts, industrial gas turbines, and three-spool (plus fan) turbofans with an intermediate spool, and geared turbo fans.

The engine 20 generally includes a low spool 30 and a high spool 32 mounted for rotation about an engine central longitudinal axis A relative to an engine case structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and the HPT 54 rotationally drive the respective low spool 30 and high spool 32 in response to the expansion.

Figure 2:
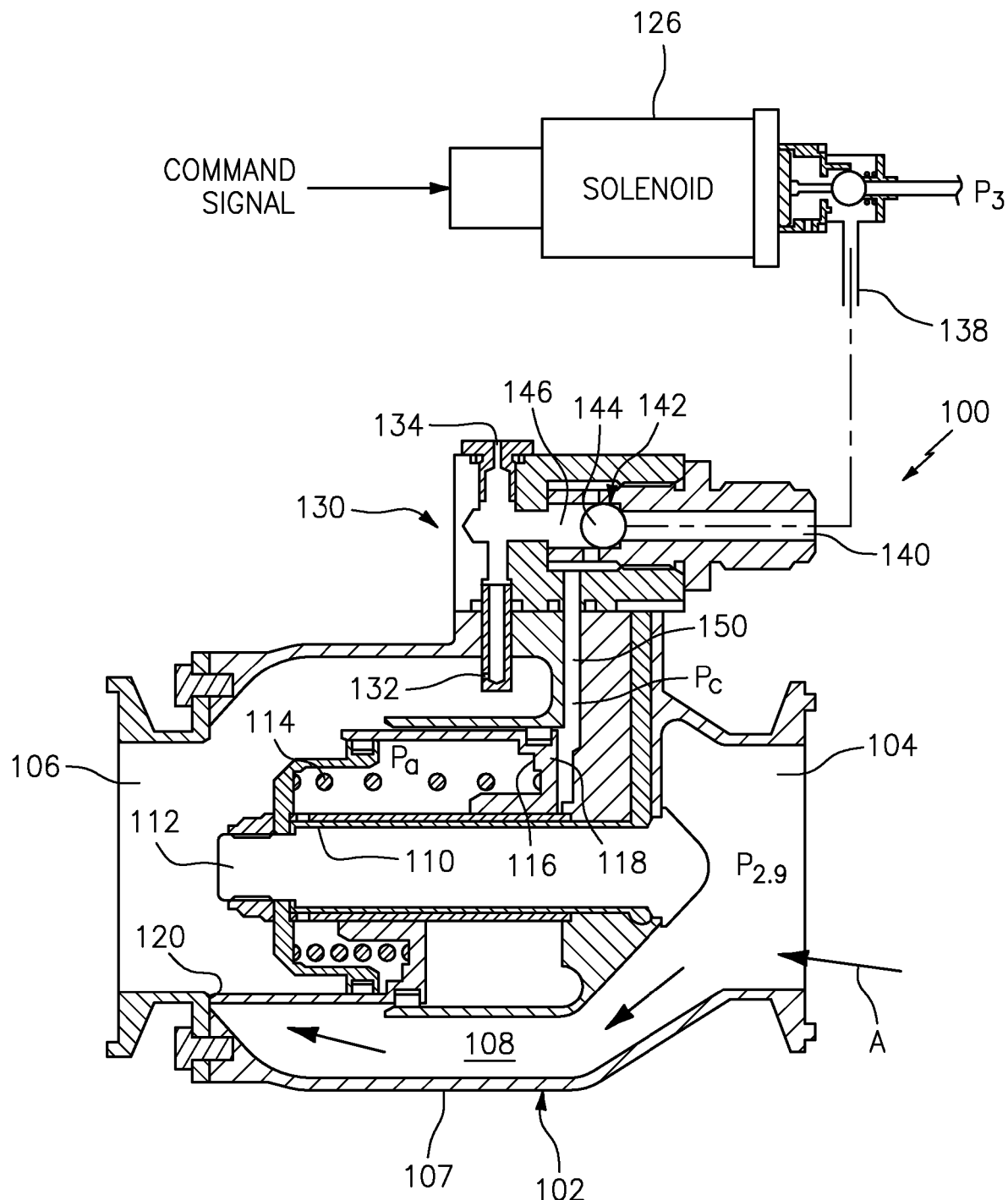
FIG. 2 is a schematic cross-section of an inline stability bleed valve.

FIG. 2 is a schematic cross-section of a stability bleed valve 100. In one embodiment the valve may be a P2.9 stage bleed valve for a gas turbine engine. The valve 100 includes a housing 102, an air inlet 104, an air outlet 106 and a center portion 107 between the inlet and the outlet to selectively provide a pneumatic flow path between the inlet and the outlet. The valve 100 also includes a passage 108 that selectively connects the air inlet 104 and the air outlet 106 when the valve is in the open position.

The valve 100 includes a sleeved piston portion 110 that slides on a center guide 112 with air pressure acting to close the airflow A through the valve 100 and a spring 114 acting to open the valve, with ambient pressure Pa on a spring side 116 of a piston 118. As the gas turbine engine starts, compressor pressure P3 increases, and the valve 100 remains in the open position until a selected valve inlet pressure is reached to counter the spring force and thus close the valve. The valve is closed by the piston sleeve sliding 110 along the guide 112 until the sleeve 110 contacts a seat 120.

With no pressure (i.e., Pa, P2.9 and P3 equal) the valve 100 is spring biased to the full open position so the inlet 104 is in pneumatic connection with the outlet 106 via the passage 108. As the engine starts and compressor pressure P3 increases, the valve 100 remains open until a prescribed compressor pressure is reached. The set point to initiate closure is dependent upon known factors such as the spring preload. As the compressor pressure P3 increases the valve 100 continues to close until the piston sleeve 110 hits the seat 120.

The valve 100 also includes a solenoid 126 that ensures the valve is closed at higher altitudes where pressure is lower. The valve also includes a pressure divider network 130 that allows the solenoid 126 to command the valve 100 closed at high altitudes to reduce leakage through the passage 108 (i.e., flow from the inlet 104 to the outlet 106), or whenever there is an override command to close the valve where otherwise it may be open. The pressure divider network 130 is configured to facilitate providing airflow through the passage 108 at a selected percentage of the pressure at the inlet 104. For example, the valve 100 may, at sea level, remain open below a P2.9 idle pressure P1 of about 60 psia (i.e., 45 psig) and be fully closed at a pressure P2 of about 85 psia (i.e., 70 psig). However, at high altitude and low pressure (e.g., ambient pressure Pa of about 4.3 psia) where compressor pressure P3 is about 36.3 psia, there is only about 32 psig (i.e., 36.3-4.3), which is not enough pressure to close the valve 100. By incorporating the orifice divider network 130 and in one embodiment assuming a divider ratio of two (i.e., A2/A1=2), then the open spring force can be reduced to 60/2=30 psia or about 15 psig at sea level. The closing is reduced to 85/2=42.5 or about 28 psig versus 32 psig available. The network area ratio A2/A1 of the orifice divide network 130 can of course be changed dependent on the desired margin.

The office divider network 130 includes a divider network inlet 132 in the passage 108, and a divider network outlet 134. As set forth in the preceding paragraph, in one embodiment the divider network outlet 134 may have an outlet cross sectional area that is about double the cross sectional area of the divider network inlet 132.

To actively command the valve 100 closed (i.e., sleeve 110 contacts seat 120), the solenoid 126 provides compressor pressure P3 via a conduit 138 to a shuttle inlet 140 of shuttle valve 142. The pressure in the conduit 138 acts on a first side of ball 144, and pressure in chamber 146 of the orifice divider network 130 acts a second side of the ball 144, opposed to the first side of the ball. This will move the ball 144 to allow the pressurized air in the conduit 138 and received at the inlet 140 to pass through shuttle conduit 150 to provide sufficient force on the piston 118 to move the sleeve 110 to contact the seat 120, thus closing the valve. Commanding the solenoid 126 to close the valve 100 prevents leakage flow from the inlet 104 to outlet 106. The flow divider network 130 and the shuttle valve 142 reduce the size of the solenoid valve and solenoid necessary to close the valve 100.

In the event of an electrical failure and loss of ability to command the valve 100 closed via the solenoid 126, the valve 100 still has the inherent (passive) capability to close as pressure increases above idle.

Figure 3:
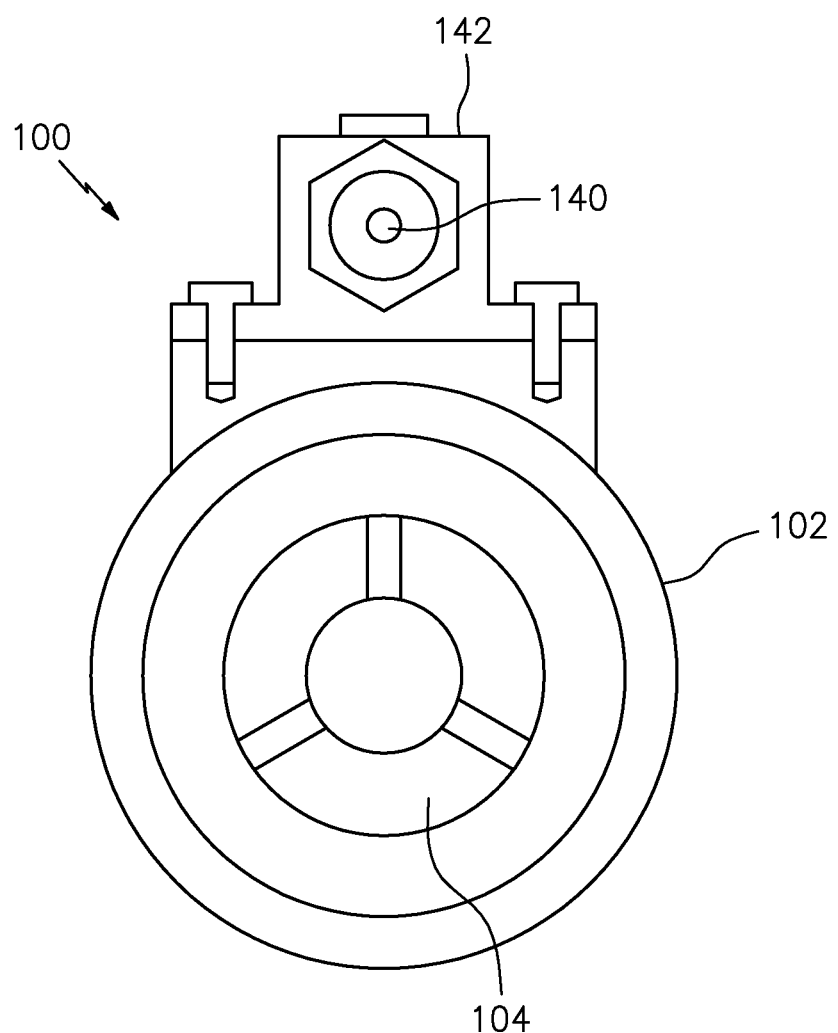
FIG. 3 is a schematic cross-section of the inline stability bleed valve of FIG. 2.

FIG. 3 is a side view of the valve 100 looking into the inlet 104.

Figure 4:
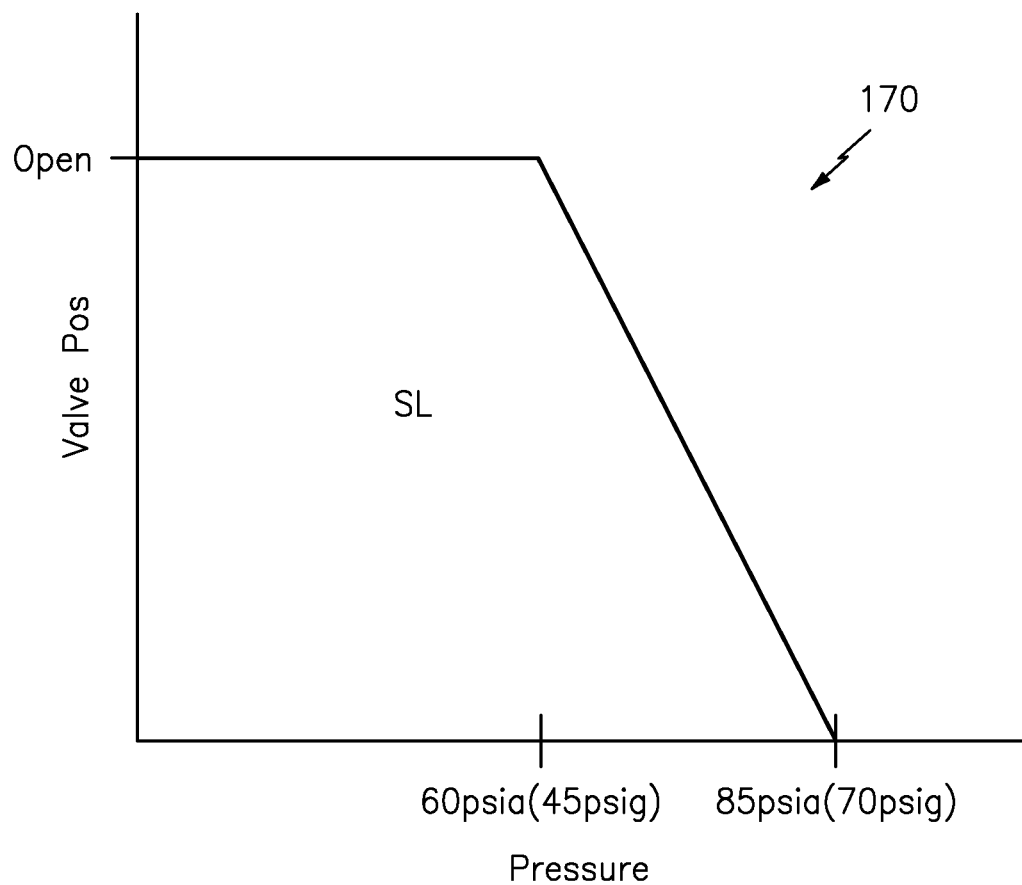
FIG. 4 is a plot of valve position versus pressure for the valve illustrated in FIGS. 2 and 3.

FIG. 4 is a plot 170 of position of the valve 100 versus pressure. Valve position is plotted along the vertical axis and valve inlet pressure (i.e., air pressure at inlet 104) is plotted along the horizontal axis. As shown, in the absence of a solenoid command to close, the valve 100 is pneumatically regulated and is in the open position until the inlet pressure (i.e., pressure at inlet 104) reaches a first value (e.g., 60 psia) and the valve 100 transitions to the closed position at a second pressure (e.g., 85 psia). When the solenoid 126 (FIG. 2) commands the valve 100 to close, the valve will immediately close. The dynamics of the valve opening and closing are a function of pneumatic factors includes the sizing of the orifices in the divider network 130 (FIG. 2). This passive function can be adjusted upwards or downwards by varying the orifice ratio in the orifice divider network.

It is contemplated that the valve casing include a bolt on manifold housing shuttle valve and orifice divider network. The inlet flange may be threaded on rather than bolted on. In addition, the valve piston may ride on a carbon bushing. The valve piston may include a multi grooved series of labyrinth grooves on its guide surface to prevent leakage. The solenoid may be mounted on the valve.

It should be understood that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A bleed air valve, comprising:
    a housing that includes an inlet at a first end, an outlet at a second end, and a center portion between the inlet and the outlet to selectively provide a pneumatic flow path between the inlet and the outlet via a passage in the center portion;
    a piston that moves along a center guide, where the piston includes a first piston surface and an opposing second piston surface, and the piston moves along the center guide in response to forces applied to the first piston surface and the second piston surface, where the piston is spring biased to an open position such that the inlet and the outlet are in fluid communication;
    a pressure divider network that includes a divider network inlet having an inlet cross sectional area in fluid communication with the passage, a divider network outlet having an outlet cross sectional area in fluid communication with ambient pressure, and a network chamber in fluid communication with the divider network inlet and the divider network outlet, where the network chamber has an intermediate pressure value between pressure at the divider network inlet and pressure at the divider network outlet and based upon the inlet cross sectional area and the outlet cross sectional area;
    a shuttle valve that includes a shuttle valve inlet and a shuttle valve outlet, where the shuttle valve outlet is in fluid communication with the piston first surface;
    a solenoid valve that receives a command signal and in response provides compressed air to a solenoid valve output that is in fluid communication with the shuttle valve inlet; and
    a spring that applies a force to the second piston surface to spring bias the bleed air valve to the open position.

2. The bleed air valve of claim 1, where the cross sectional area of the divider network outlet is greater than the cross sectional area of the divider network inlet.

3. The bleed air valve of claim 1, where the solenoid valve receives gas turbine engine compressor discharge pressure such that when the solenoid valve that receives the command signal to close the solenoid valve provides the compressor discharge pressure to the solenoid valve output.

4. The bleed air valve of claim 3, where the cross sectional area of the divider network inlet is less than 50% of the cross sectional area of the divider network outlet.

5. The bleed air valve of claim 1, where the center guide is axially aligned with the housing inlet and the housing outlet.

6. The bleed air valve of claim 3, where the shuttle valve also includes a second shuttle valve inlet in fluid communication with the network chamber.

7. The bleed air valve of claim 6, where the shuttle valve is integral with the housing.

8. A bleed air valve, comprising:
a housing that includes an inlet at a first end, an outlet at a second end, and a center portion between the inlet and the outlet to selectively provide a pneumatic flow path between the inlet and the outlet via a passage in the center portion;
a piston that moves along a center guide, where the piston includes a first piston surface and an opposing second piston surface, and the piston moves along the center guide in response to forces applied to the first piston surface and the second piston surface, where the piston is spring biased to an open position such that the housing inlet and the housing outlet are in fluid communication;
a pressure divider network that includes a divider network inlet having an inlet cross sectional area in fluid communication with the passage, a divider network outlet having an outlet cross sectional area in fluid communication with ambient pressure, and a network chamber in fluid communication with the divider network inlet and the divider network outlet, where the network chamber has an intermediate pressure value between pressure at the divider network inlet and pressure at the divider network outlet;
a valve that includes a valve inlet and a valve outlet, where the valve outlet is in fluid communication with the piston first surface; and
a control valve that receives a command signal and in response provides compressed air to a control valve output that is in fluid communication with the valve inlet.

9. The bleed air valve of claim 8, further comprising a spring that applies a force to the second piston surface.

10. The bleed air valve of claim 9, where the network chamber has an intermediate pressure value is dependent on the inlet cross sectional area and the outlet cross sectional area.

11. The bleed air valve of claim 10, where the valve also includes a second valve inlet in fluid communication with the network chamber.

12. The bleed air valve of claim 11, where the cross sectional area of the divider network inlet is less than 50% of the cross sectional area of the divider network.

13. The bleed air valve of claim 12, where the control valve comprises an electromechanical valve.

14. The bleed air valve of claim 13, where the valve comprises a shuttle valve.

15. An aircraft gas turbine engine bleed air valve, comprising:
a housing that includes an inlet at a first end, an outlet at a second end, and a center portion between the inlet and the outlet to selectively provide a pneumatic flow path between the inlet and the outlet via a passage in the center portion;
a piston that axially moves along a center guide, where the piston includes a first piston surface and an opposing second piston surface, and the piston axially moves along the center guide in response to forces applied to the first piston surface and the second piston surface, where the piston is spring biased to an open position such that the inlet and the outlet are in fluid communication;
a pressure divider network that includes a divider network inlet having an inlet cross sectional area in fluid communication with the passage, a divider network outlet having an outlet cross sectional area in fluid communication with ambient pressure, and a network chamber in fluid communication with the divider network inlet and the divider network outlet, where the network chamber has an intermediate pressure value between pressure at the divider network inlet and pressure at the divider network outlet;
a shuttle valve that includes a shuttle valve inlet and a shuttle valve outlet, where the shuttle valve outlet is in fluid communication with the piston first surface;
an electromechanical valve that receives a command signal and in response provides compressed air to an electromechanical valve output that is in fluid communication with the shuttle valve inlet; and
a spring that applies a force to the second piston surface to spring bias the aircraft gas turbine engine bleed air valve to the open position to bleed compressor air to ambient.

16. The bleed air valve of claim 15, where the network chamber intermediate pressure value is dependent on the inlet cross sectional area and the outlet cross sectional area.

17. The bleed air valve of claim 16, where the shuttle valve also includes a second shuttle valve inlet in fluid communication with the network chamber.

* * * * *